(12) United States Patent
Chang

(10) Patent No.: US 6,820,527 B2
(45) Date of Patent: Nov. 23, 2004

(54) TABLE SAW HAVING A BLADE SUSPENSION STRUCTURE

(76) Inventor: Chin-Chin Chang, No. 2, Alley 113, Lane 967, San Feng Road, Feng Yuan, Taichung Hsien (TW)

( * ) Notice: Subject to any disclaimer, the term of this patent is extended or adjusted under 35 U.S.C. 154(b) by 12 days.

(21) Appl. No.: 10/313,630

(22) Filed: Dec. 6, 2002

(65) Prior Publication Data

US 2004/0107814 A1 Jun. 10, 2004

(51) Int. Cl.[7] .............................. B23D 45/06; B26D 1/14
(52) U.S. Cl. ....................................... 83/471.2; 83/477.1
(58) Field of Search .............................. 83/98, 99, 168, 83/477.1, 477.2, 471.3, 432, 471.1, 473, 481, 490, 491, 508.2, 581, 582, 603, 608, 574; 144/286.5

(56) References Cited

U.S. PATENT DOCUMENTS

| | | | | |
|---|---|---|---|---|
| 1,093,198 A | * | 4/1914 | Newport | 83/102.1 |
| 2,008,673 A | * | 7/1935 | Ocenasek | 83/473 |
| 2,852,047 A | * | 9/1958 | Odlum et al. | 83/473 |
| 3,115,166 A | * | 12/1963 | Goldschimdt et al. | 83/433 |
| 3,368,596 A | * | 2/1968 | Comer | 83/473 |
| 4,599,927 A | * | 7/1986 | Eccardt et al. | 83/473 |
| 5,943,932 A | * | 8/1999 | Sberveglieri | 83/471.3 |
| 6,009,782 A | * | 1/2000 | Tajima et al. | 83/99 |
| 6,283,002 B1 | * | 9/2001 | Chiang | 83/477.1 |
| 6,546,835 B2 | * | 4/2003 | Wang | 83/477.1 |
| 2003/0101857 A1 | * | 6/2003 | Chuang | 83/477.1 |
| 2003/0150312 A1 | * | 8/2003 | Chang | 83/473 |

* cited by examiner

Primary Examiner—Allan N. Shoap
Assistant Examiner—Ghassem Alie

(57) ABSTRACT

A table saw includes a suspension rod having a bottom face formed with a flattened face, and a motor gear box rotatably mounted on the suspension rod and having a top face formed with a recess. When the motor gear box touches the suspension rod, the flattened face of the suspension rod is received in the recess of the motor gear box, thereby reducing the vertical distance between the rotation shaft of the circular blade and the work table, so that the height of the circular blade protruding outward from the work table is increased, thereby increasing the cutting height of the circular blade, so that the circular blade may be used to cut a workpiece having a larger thickness, thereby increasing the cutting efficiency of the table saw.

3 Claims, 4 Drawing Sheets

TABLE SAW HAVING A BLADE SUSPENSION STRUCTURE

BACKGROUND OF THE INVENTION

1. Field of the Invention

The present invention relates to a table saw having a blade suspension structure, and more particularly to a table saw having a blade suspension structure, wherein the cutting height of the circular blade is increased, so that the circular blade may be used to cut a workpiece having a larger thickness, thereby increasing the cutting efficiency of the table saw.

2. Description of the Related Art

A conventional table saw in accordance with the prior art shown in FIGS. 1 and 2 comprises a work table 6 formed with a cutting slot 60 for passage of a circular blade 5 that is used to cut the workpiece (not shown). A suspension rod 1 is secured on the bottom of the work table 6. A swing seat 7 is pivotally mounted on the suspension rod 1. A rotation seat 3 is rotatably mounted on the swing seat 7. A motor gear box 4 is secured on the rotation seat 3 to rotate therewith. The circular blade 5 is rotatably mounted on the motor gear box 4, and is extended through the cutting slot 60 of the work table 6. A threaded rod 2 is rotatably mounted on the swing seat 7, and has a first end rested on the rotation seat 3 for pushing the rotation seat 3 and a second end provided with a hand wheel 8 which is used to rotate the threaded rod 2.

In operation, the threaded rod 2 is rotated by the hand wheel 8 to move on the swing seat 7 to push the rotation seat 3 to rotate relative to the swing seat 7, so that the motor gear box 4 and the circular blade 5 are moved upward by rotation of the rotation seat 3, and the circular blade 5 is protruded outward from the cutting slot 60 of the work table 6, thereby adjusting the cutting height of the circular blade 5.

However, the top of the motor gear box 4 is corresponding to the bottom of the suspension rod 1, so that no gap is formed between the top of the motor gear box 4 and the bottom of the suspension rod 1. Thus, when the workpiece has a larger thickness, the cutting height of the circular blade 5 cannot be adjusted, thereby decreasing the cutting efficiency of the table saw.

SUMMARY OF THE INVENTION

The present invention has arisen to mitigate and/or obviate the disadvantage of the conventional table saw.

The primary objective of the present invention is to provide a table saw having a blade suspension structure, wherein the cutting height of the circular blade is increased, so that the circular blade may be used to cut a workpiece having a larger thickness, thereby increasing the cutting efficiency of the table saw.

Another objective of the present invention is to provide a table saw having a blade suspension structure, wherein when the motor gear box touches the suspension rod, the flattened face of the suspension rod is received in the recess of the motor gear box, thereby reducing the vertical distance between the rotation shaft of the circular blade and the work table, so that the height of the circular blade protruding outward from the cutting slot of the work table is increased, thereby increasing the cutting height of the circular blade.

In accordance with the present invention, there is provided a table saw having a blade suspension structure, comprising:

a suspension rod having a bottom face formed with a recessed flattened face; and a motor gear box rotatably mounted on the suspension rod and located under the suspension rod, the motor gear box having a top face formed with a recess facing the flattened face of the suspension rod.

Further benefits and advantages of the present invention will become apparent after a careful reading of the detailed description with appropriate reference to the accompanying drawings.

DETAILED DESCRIPTION OF THE INVENTION

Figure 1:
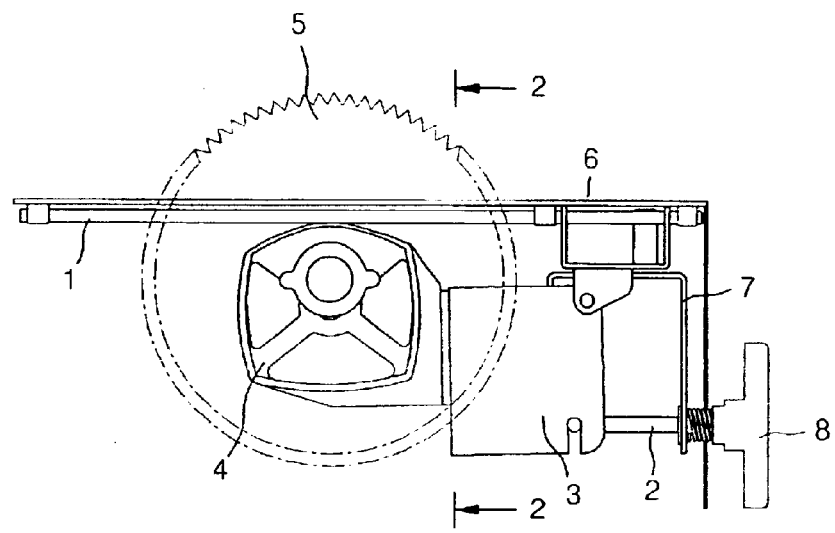
FIG. 1 is a side plan cross-sectional view of a conventional table saw in accordance with the prior art.
Figure 2:
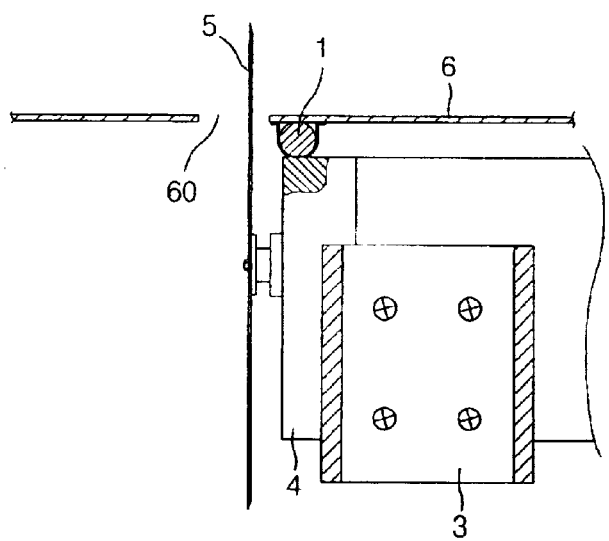
FIG. 2 is a plan cross-sectional view of the conventional table saw structure taken along line 2—2 as shown in FIG. 1.

Referring to the drawings and initially to FIGS. 3–6, a table saw having a blade suspension structure in accordance with a preferred embodiment of the present invention comprises a work table 10 formed with a cutting slot 100 for passage of a circular blade 40 that is used to cut the workpiece (not shown). A suspension rod 15 is secured on the bottom of the work table 10. A swing seat 25 is pivotally mounted on the suspension rod 15. A rotation seat 22 is rotatably mounted on the swing seat 25 by a pivot shaft 23. A motor seat 30 and a motor gear box 31 are secured on the rotation seat 22 to rotate therewith. The circular blade 40 is rotatably mounted on the motor gear box 31, and is extended through the cutting slot 100 of the work table 10. A threaded rod 21 is rotatably mounted on the swing seat 25, and has a first end rested on the rotation seat 22 for pushing the rotation seat 22 and a second end provided with a hand wheel 20 which is used to rotate the threaded rod 21.

Figure 3:
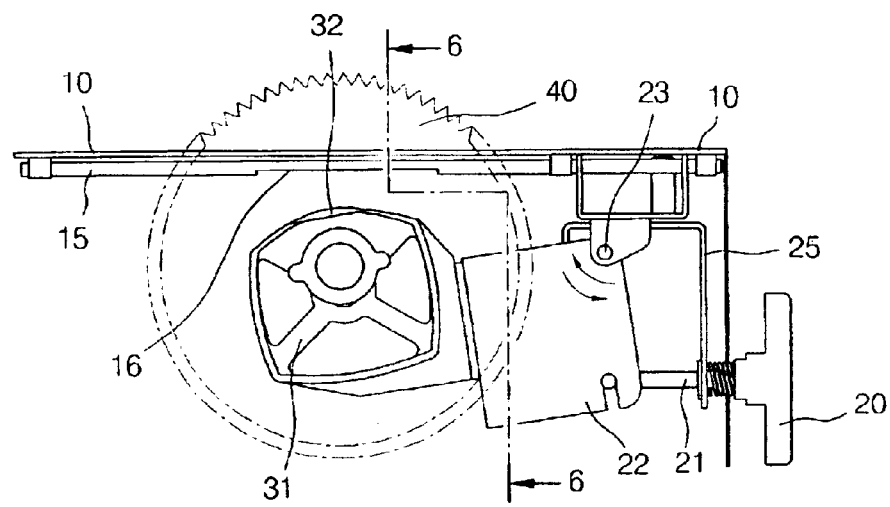
FIG. 3 is a side plan cross-sectional view of a table saw having a blade suspension structure in accordance with a preferred embodiment of the present invention.
Figure 6:
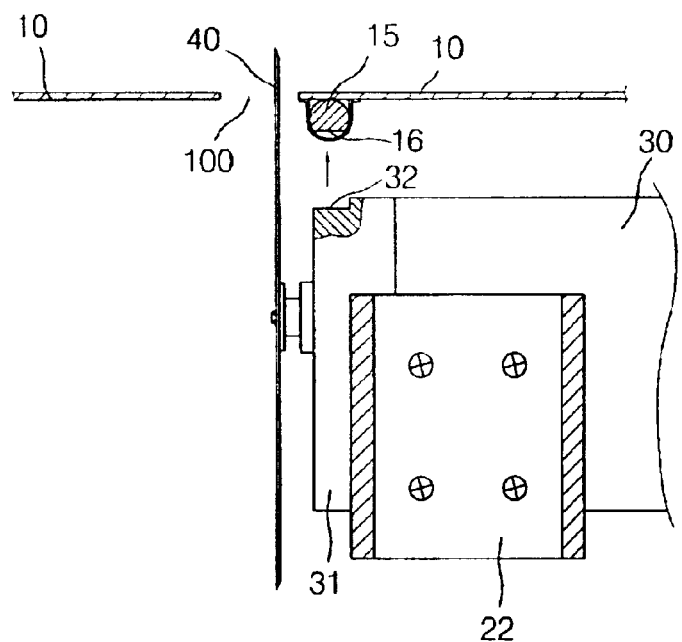
FIG. 6 is a plan cross-sectional view of the table saw having a blade suspension structure taken along line 6—6 as shown in FIG. 3.
Figure 7:
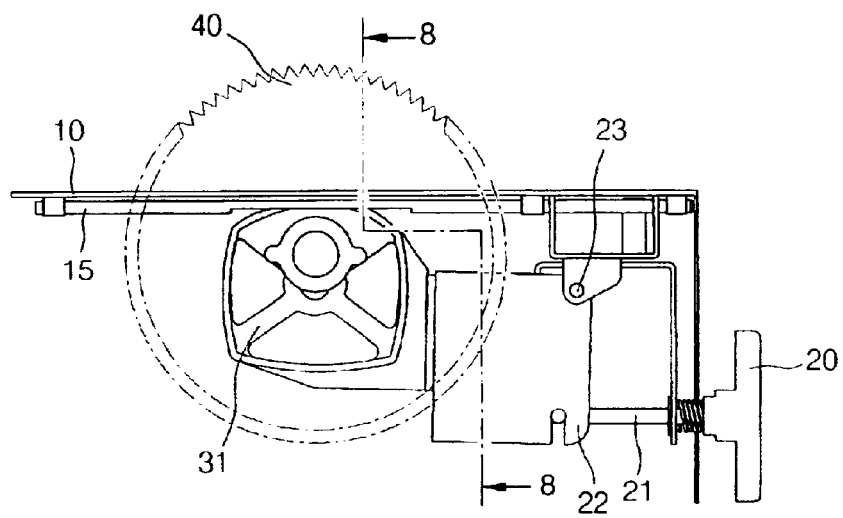
FIG. 7 is a schematic operational view of the table saw having a blade suspension structure as shown in FIG. 3 in use.
Figure 8:
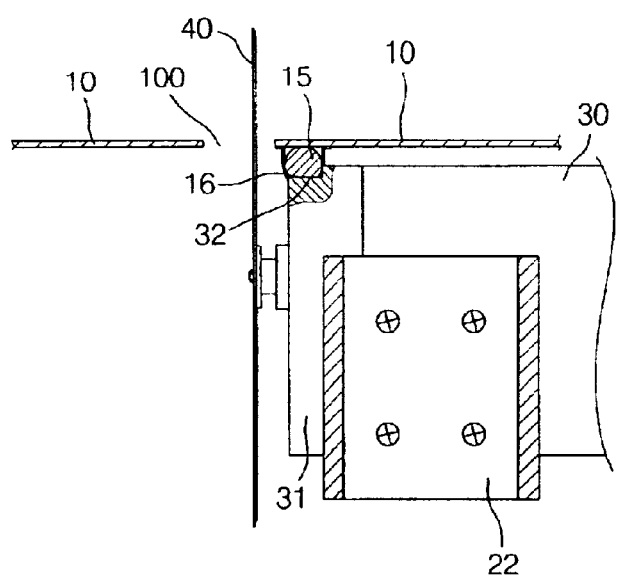
FIG. 8 is a plan cross-sectional view of the table saw having a blade suspension structure taken along line 8—8 as shown in FIG. 7.

In operation, the threaded rod 21 is rotated by the hand wheel 20 to move on the swing seat 25 to push the rotation seat 22 to rotate relative to the swing seat 25, so that the motor gear box 31 and the circular blade 40 are moved upward by rotation of the rotation seat 22 to move from the position as shown in FIGS. 3 and 6 to the position as shown in FIGS. 7 and 8, and the circular blade 40 is further protruded outward from the cutting slot 100 of the work table 10, thereby adjusting the cutting height of the circular blade 40.

Figure 4:
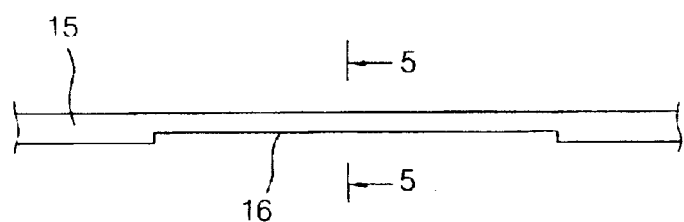
FIG. 4 is a partially cut-away enlarged view of a suspension rod of the table saw having a blade suspension structure as shown in FIG. 3.
Figure 5:
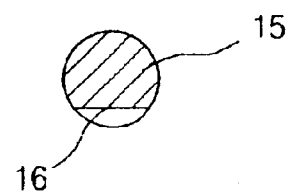
FIG. 5 is a plan cross-sectional view of the suspension rod of the table saw having a blade suspension structure taken along line 5—5 as shown in FIG. 4.

As shown in FIGS. 4–6, the suspension rod 15 has a bottom face formed with a recessed flattened face 16. In addition, the motor gear box 31 has a top face formed with a recess 32 facing the flattened face 16 of the suspension rod 15.

Thus, when the motor gear box 31 and the circular blade 40 are moved to the position as shown in FIGS. 7 and 8, the flattened face 16 of the suspension rod 15 is received in the recess 32 of the motor gear box 31, thereby reducing the vertical distance between the rotation shaft (not shown) of the circular blade 40 and the work table 10, so that the height of the circular blade 40 protruding outward from the cutting slot 100 of the work table 10 is increased, thereby increasing the cutting height of the circular blade 40.

Accordingly, the cutting height of the circular blade 40 is increased, so that the circular blade 40 may be used to cut a workpiece having a larger thickness, thereby increasing the cutting efficiency of the table saw.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A table saw having a blade suspension structure, comprising:

a work table formed with a cutting slot for passage of a circular blade;

a suspension rod secured on the bottom of the work table and having a bottom face formed with a recessed flattened face;

a motor gear box rotatably mounted on the suspension rod and located under the suspension rod, the motor gear box having a top face formed with a recess facing the flattened face of the suspension rod, wherein the recessed flattened face of the suspension rod is received in the recess of the motor gear box when the top face of the motor gear box touches the bottom face of the suspension rod;

a swing seat pivotally mounted on the suspension rod;

a rotation seat rotatably mounted on the swing seat by a pivot shaft, wherein the motor gear box is secured on the rotation seat to rotate therewith; and a threaded rod rotatably mounted on the swing seat, and having a first end rested on the rotation seat for pushing the rotation seat and a second end provided with a hand wheel which is used to rotate the threaded rod.

2. The table saw having a blade suspension structure in accordance with claim 1, further comprising a motor seat secured on the rotation seat to rotate therewith.

3. The table saw having a blade suspension structure in accordance with claim 1, further comprising a circular blade rotatably mounted on the motor gear box.

* * * * *